United States Patent
Ito

(10) Patent No.: US 6,239,860 B1
(45) Date of Patent: May 29, 2001

(54) ADJUSTMENT OF VERTICAL REGIST SHIFT BETWEEN PAGES, COLORS OR LINES IN A MULTIPLE BEAM RECORDING SYSTEM

(75) Inventor: Satoru Ito, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/235,291

(22) Filed: Jan. 22, 1999

(30) Foreign Application Priority Data

Jan. 23, 1998 (JP) ................................................. 10-011155

(51) Int. Cl.$^7$ ........................... G03B 27/72; G03B 27/52; H01J 40/14; H01J 5/16
(52) U.S. Cl. ........................... 355/41; 355/35; 250/578.1; 250/236
(58) Field of Search ................................. 355/41, 35, 45, 355/51, 60, 66, 69; 250/236, 234, 235, 578.1; 359/204; 358/474; 347/224

(56) References Cited

U.S. PATENT DOCUMENTS 5,834,766 * 11/1998 Suhara ................................. 250/234
6,005,243 * 12/1999 Yamazaki ............................ 250/234

FOREIGN PATENT DOCUMENTS 8-142412    6/1996  (JP) .

* cited by examiner

*Primary Examiner*—Russell Adams
*Assistant Examiner*—Peter B. Kim
(74) *Attorney, Agent, or Firm*—Oblon, Spivak, McClelland, Maier & Neustadt, P.C.

(57) ABSTRACT

An image forming apparatus which can reduce the appearance of a vertical regist shift in a multiple beam writing system. A time interval detector is provided and is configured to detect a time interval between a start signal for scanning in a sub-scanning direction and a synchronous signal for scanning in a scanning direction. Further, this time interval is compared with at least first and second threshold values. Writing by the multiple beam sources is then controlled based on the results of the comparison. By utilizing such an operation the appearance of a vertical regist shift can be reduced.

21 Claims, 14 Drawing Sheets

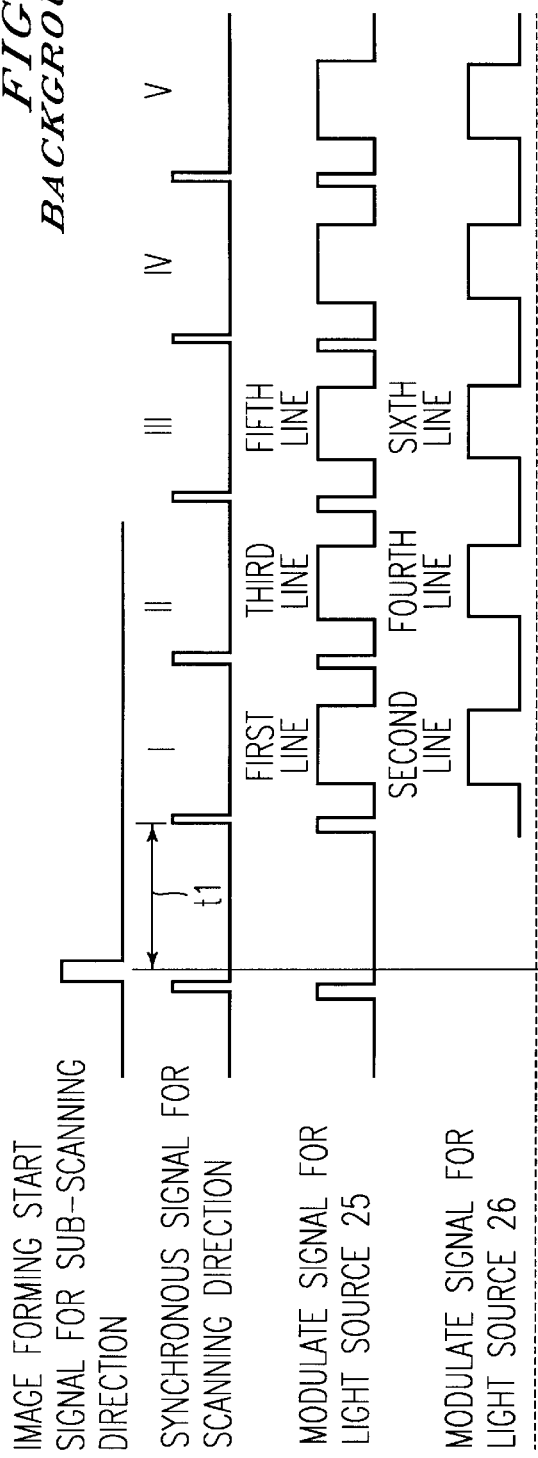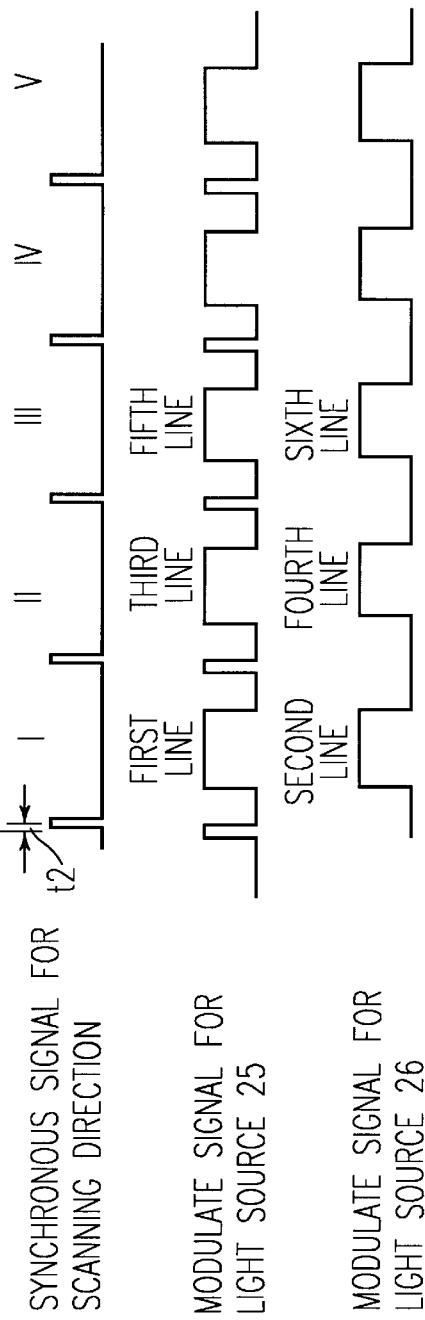

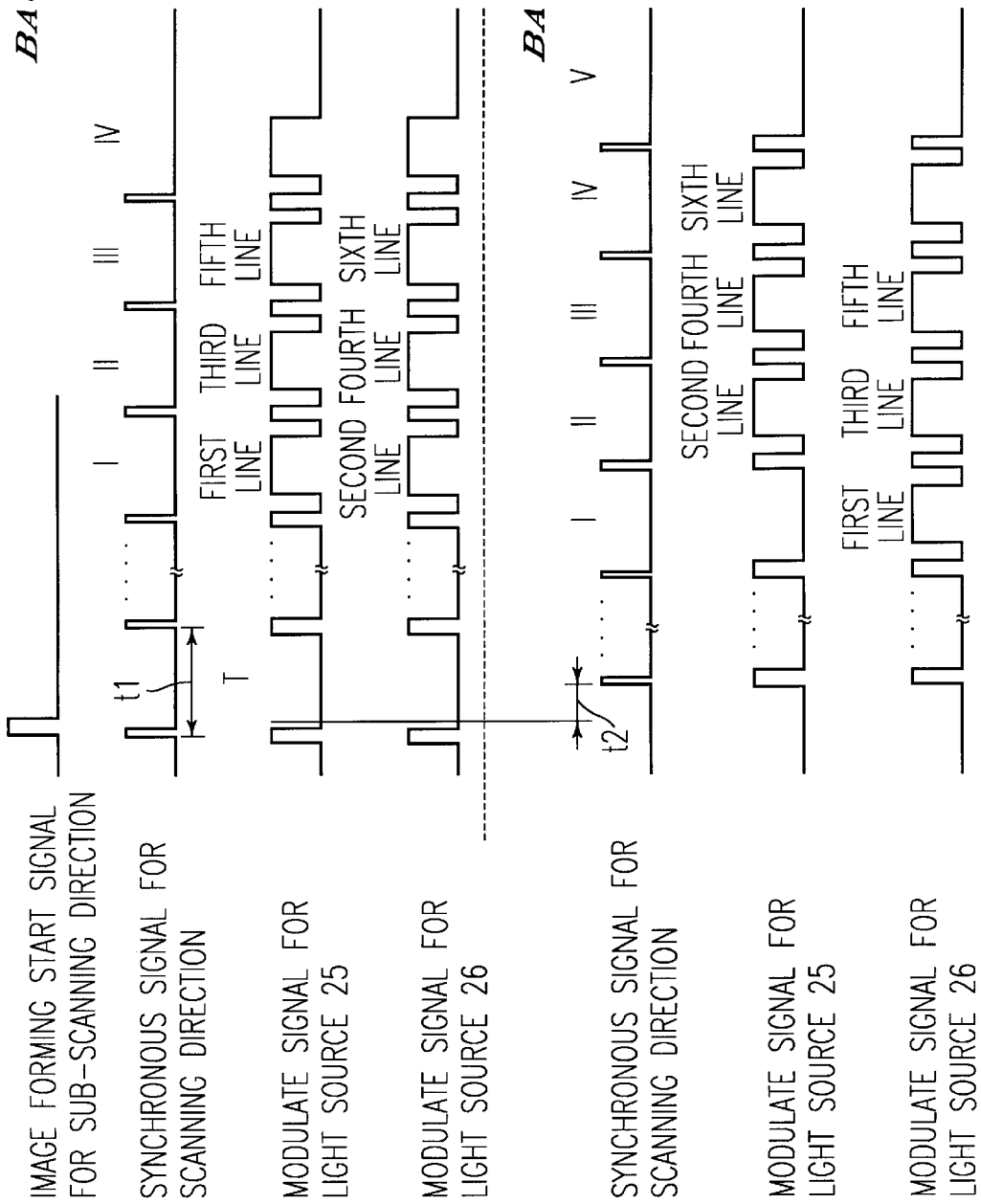

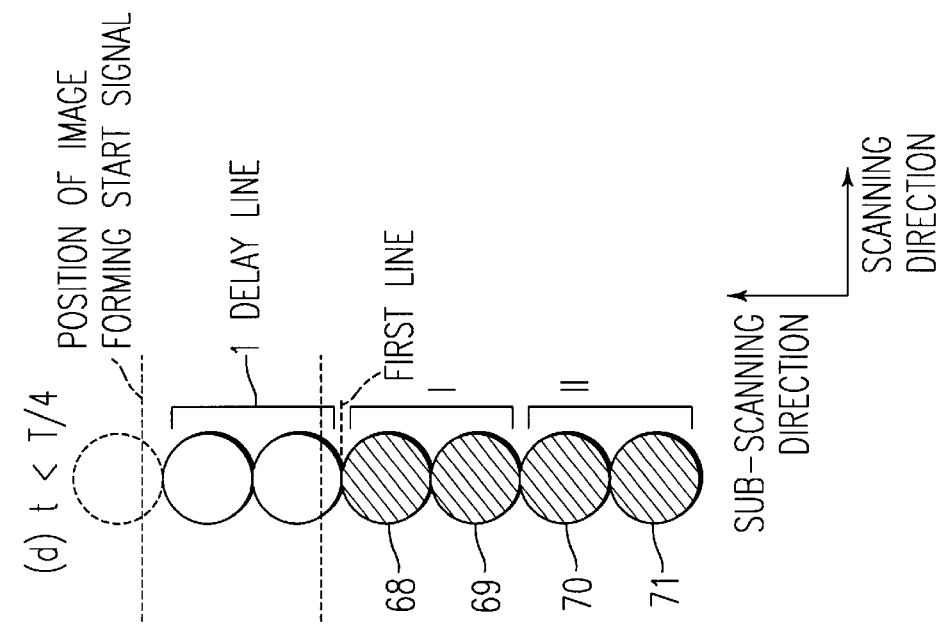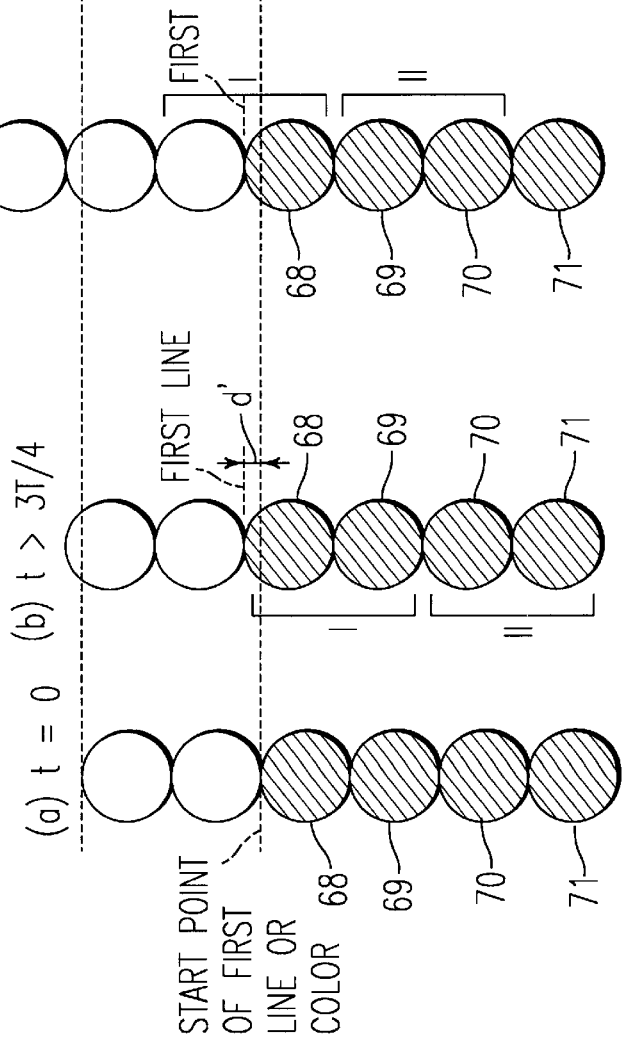

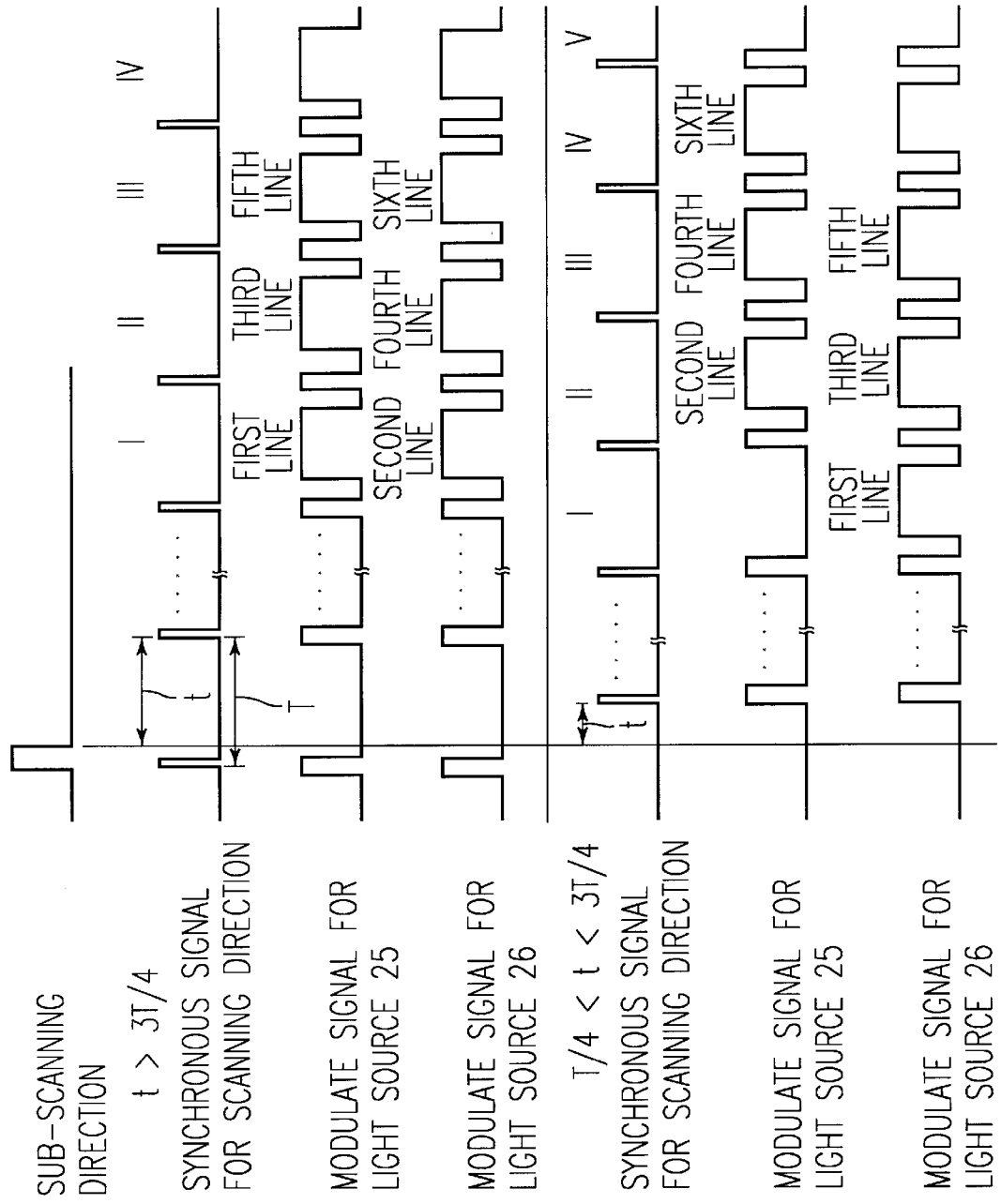

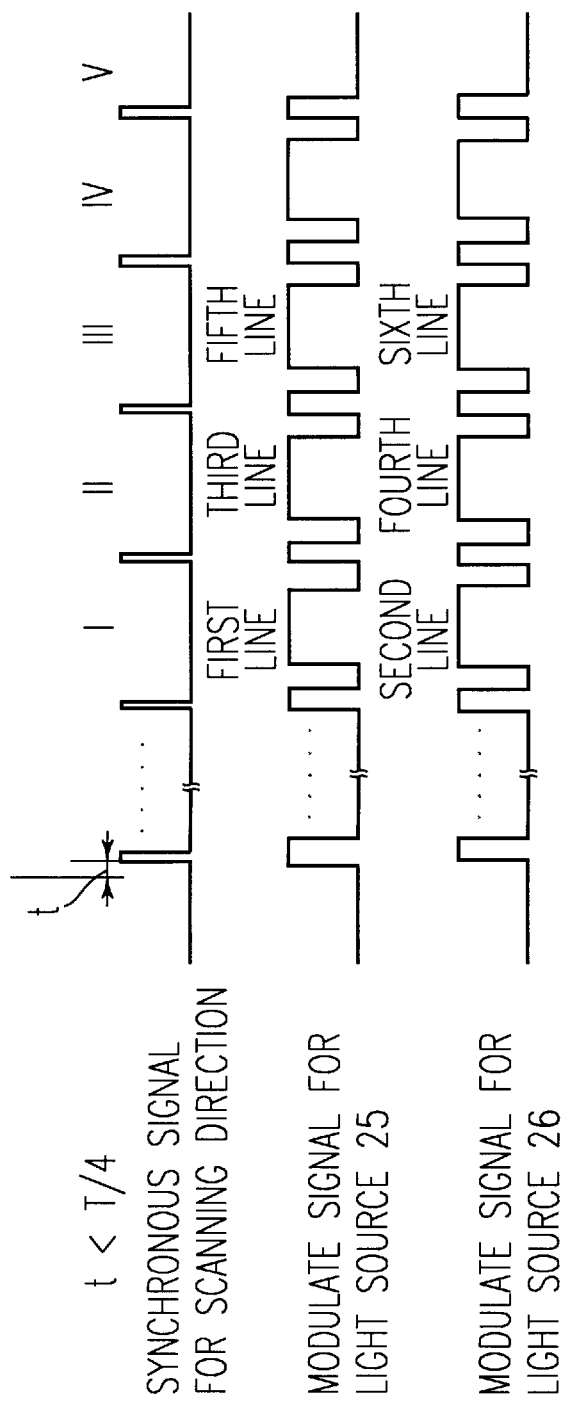

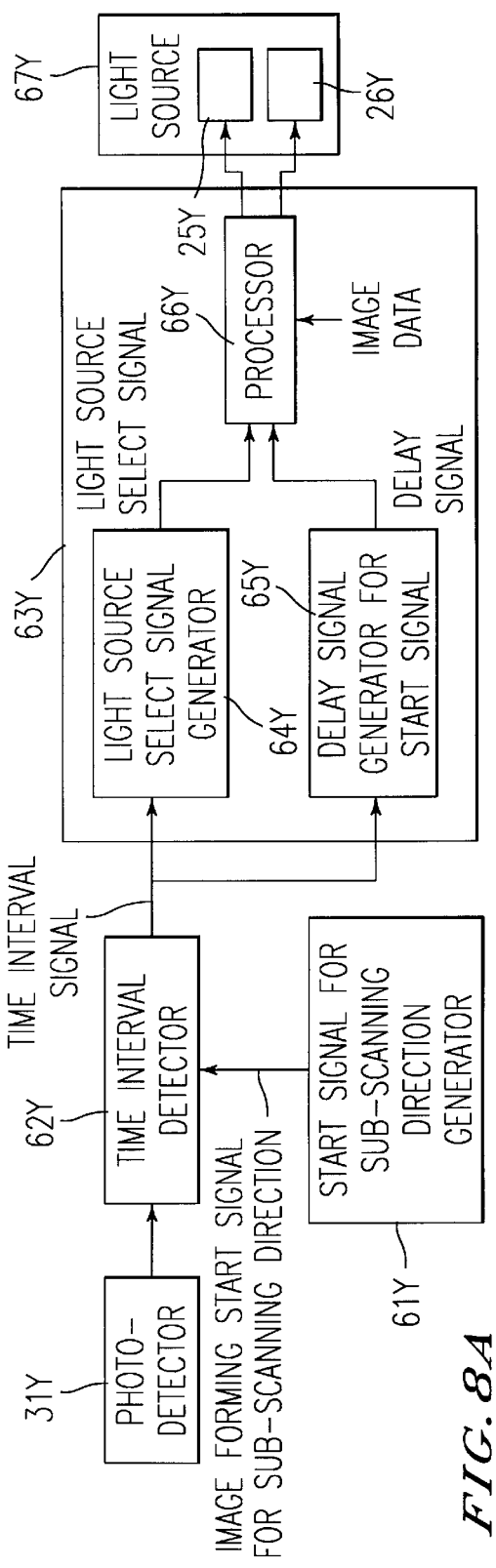
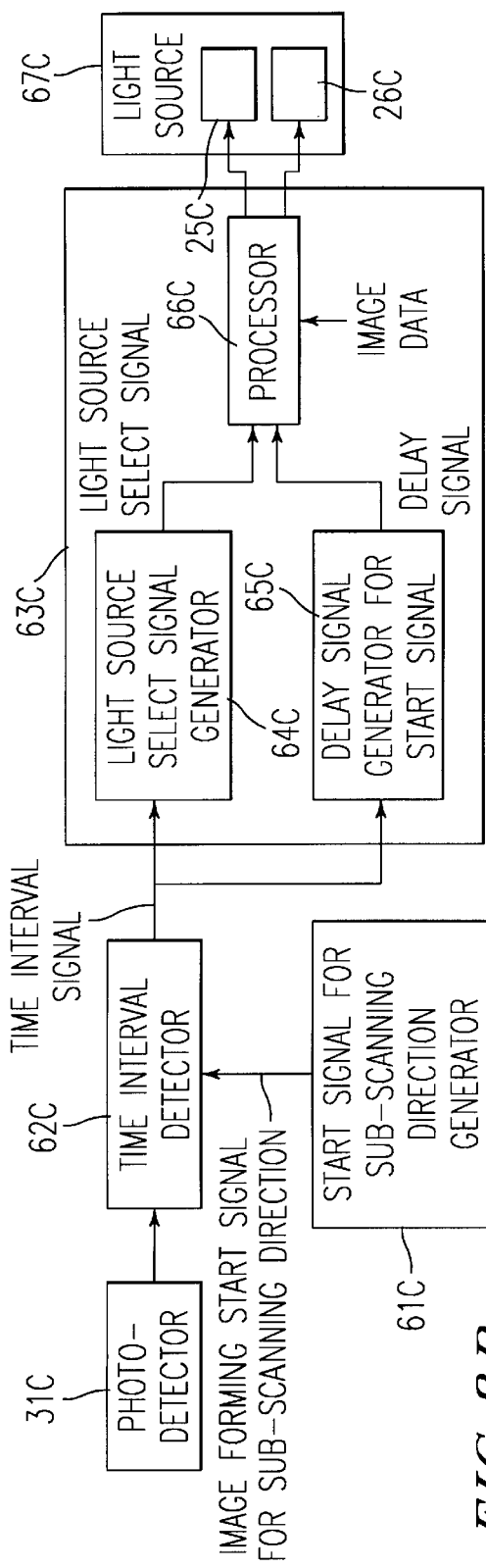
FIG. 8A
FIG. 8B

ADJUSTMENT OF VERTICAL REGIST SHIFT BETWEEN PAGES, COLORS OR LINES IN A MULTIPLE BEAM RECORDING SYSTEM

BACKGROUND OF THE INVENTION

1. Field of the Invention

The present invention is related to an apparatus, method, and system for adjusting a vertical regist shift between lines, pages or colors in a multiple beam recording system, and more particularly is directed to controlling the writing of information from the multiple beams to limit the vertical regist shift.

2. Discussion of the Background Art

A multiple beam optical scanning system for writing information onto a photoconductive drum is shown in FIG. 1. In this multiple beam optical system, two light sources 25 and 26 are provided for generating laser beams for effecting writing onto the photoconductive drum 14. The laser beams output of the light sources 25 and 26 pass through a collimator lens 27, reflect off a polygonal mirror 28, pass through a further lens 29, and then impinge on the photoconductive drum 14. The polygonal mirror 28 is rotated by a motor 30 and the photoconductive drum 14 is rotated by a motor 32. Further, a photodetector 31 is provided for detecting a synchronous signal to effect scanning across the photoconductive drum 14 in the scanning direction. With this structure, the light sources 25 and 26 generate laser beams which scan across the photoconductive drum 14 in a scanning direction, and which generate different lines of information in a sub-scanning direction (i.e. the direction of rotation of the photoconductive drum 14).

This system shown in FIG. 1, however, may suffer from a problem of a vertical regist shift during the following situation. The detected signal from the photodetector 31 is utilized as a synchronizing signal for the scanning direction. An image forming start signal for the sub-scanning direction, to start rotation of the photoconductive of drum 14, is also generated. Further, when the image forming start signal is output image data is read out from a memory (a RAM, ROM, etc.) or from a memory via registers and the image forming operation starts. However, the situation may arise that the image forming start signal is not synchronized with the detected signal from photodetector 31. As a result, situations as shown in FIGS. 2a and 2b arise in an image forming operation, and during a series of image forming operations. Certain kinds of vertical regist shifts may occur based on the above lack of synchronization between the image forming start signal and the detected signal from the photodetector 31.

When the situations as shown in FIGS. 2a and 2b exist in an image forming operation, a vertical regist shift may occur on output sheets of paper on which a same image is printed, on lines on a sheet of paper, or on colors on a sheet of paper. When the image forming device prints the same image on plural sheets of paper by plural image forming operations, a vertical regist shift may occur between the same position of each line of each paper. Also, when a color image forming device outputs color images on a single sheet of paper, a vertical regist shift may occur between each color image on the sheet. For example, a vertical regist shift may occur between a cyan color image and a magenta color image. A vertical regist shift may also occur between lines in a sheet of paper on a monochrome image forming device.

A normal operation and an operation which results in the vertical resist shift are explained in further detail with reference to FIGS. 2a and 2b which show two cases in the operation of the system of FIG. 1. FIGS. 2a and 2b disclose a range of a vertical regist shift based upon a relation between the image forming start signal and the synchronous signal for the scanning direction (i.e., the detected signal from the photodetector 31).

In the operation of the system of FIG. 1 shown in the second case of FIG. 2b, the synchronous signal for the scanning direction (as detected by photoconductor 31) is generated just after the image forming start signal for the subscanning direction (which starts rotation of the photoconductive drum 14). As a result, in this operation of FIG. 2b the first and second lines of information are immediately written at their appropriate positions.

In this operation of the system of FIG. 1 the writing on the photoconductive drum 14 is determined to start after a predetermined number of synchronous signals are detected (i.e., when a designated synchronous signal is detected) after the image forming start signal for the sub-scanning direction is detected. That is, in the operation of the system shown in FIG. 1 the photodetector 31 detects a signal to start writing onto the photoconductive drum 14, and thereby the photodetector 31 provides an image forming start signal for the scanning direction. Further, the system as shown in FIG. 1 is designed so that a predetermined number of synchronous signals for the scanning direction are generated prior to writing of the first and second lines of information onto the photoconductive drum 14. In the operation shown in FIG. 2b such a predetermined number of synchronous signals prior to the designated synchronous signal for writing are not shown.

In this first case of FIG. 2a a synchronous signal (to initiate writing by the laser beams output of light sources 25 and 26 onto the photoconductive drum 14) for the scanning direction occurs just prior to the image forming start signal for the sub-scanning direction (which starts rotation of the photoconductive drum 14). As a result, the designated synchronous signal for the scanning direction which is detected after the image forming start signal is a significant time t1 after the image forming start signal. In this situation, the first and second lines are not written onto the photoconductive drum 14 until approximately one time cycle later than desired. This problem is significant in a multiple beam scanning system because each time cycle for writing corresponds to a shift of two lines if two light sources 25, 26 are being used, or a shift of three lines if three light sources are being used, etc.

One system for addressing this vertical regist shift operation is disclosed in Japanese Laid-Open Patent Application 08-142412. A control operation executed in this Japanese Laid-Open Patent Application 08-142412 is described in FIGS. 3a and 3b of the present specification.

In the system of this further background art a time interval detector for detecting a time from an image forming start signal for a sub-scanning direction and a synchronous signal for the scanning direction is measured, and a light source selector is provided to select between activating the light sources 25 and 26 based on this detected time interval.

More particularly, in this background art in a second case of FIG. 3b if a certain time interval t2 occurs between the image forming start signal for the sub-scanning direction and the synchronous signal for the scanning direction (which time interval t2 is detected by a time interval detector), a first line is written by only one of the light sources, and then for subsequent lines both of the light sources operate to write lines simultaneously. In the example shown in FIG. 3b, with the time interval t2 the first line is written onto the photoconductive drum 14 by the light source 26, and then the second and third lines are simultaneously written by both the light sources 25 and 26 after a second synchronous signal is detected, and so on.

This operation disclosed in Japanese Laid-Open Patent Application No. 08-142412 provides a benefit that a vertical regist shift between lines, colors or pages can be decreased to one line. However, this reduction in the vertical regist shift may still be unacceptable in a multiple beam writing system, and particularly if the multiple beam writing system of FIG. 1 is utilized in a color copier where different colors must be precisely superimposed upon one another. The contents of this reference, Japanese Laid-Open Patent Application No. 08-142,412, are incorporated herein by reference.

SUMMARY OF THE INVENTION

Accordingly, one object of the present invention is to provide a novel image forming apparatus which can overcome the above discussed drawbacks in the background art.

A further object of the present invention is to provide a novel image forming apparatus which can further reduce any vertical regist shift in a multiple beam writing system,.

To achieve these and other objects, the present invention implements a system in which an image forming apparatus includes a time interval detector configured to detect a time interval between a start signal for scanning in a sub-scanning direction and a synchronous signal for scanning in a scanning direction. Further, this time interval is compared with at least first and second threshold values in the present invention. Writing by the multiple beam sources is then controlled in the present invention based on the results of the comparison. By utilizing such an operation in the present invention a vertical regist shift can be reduced.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 2a and 2b show one background implementation of a control of the multiple beam writing system of FIG. 1;

FIGS. 3a and 3b show a further background implementation of a control of the multiple beam writing system of FIG. 1 which reduces vertical regist shift;

FIGS. 6a–6d further show the writing operation in an embodiment of the present invention;

FIGS. 7a–7d shows timing charts of the operations in FIGS. 5 and 6;

DESCRIPTION OF THE PREFERRED EMBODIMENTS

Figure 1:
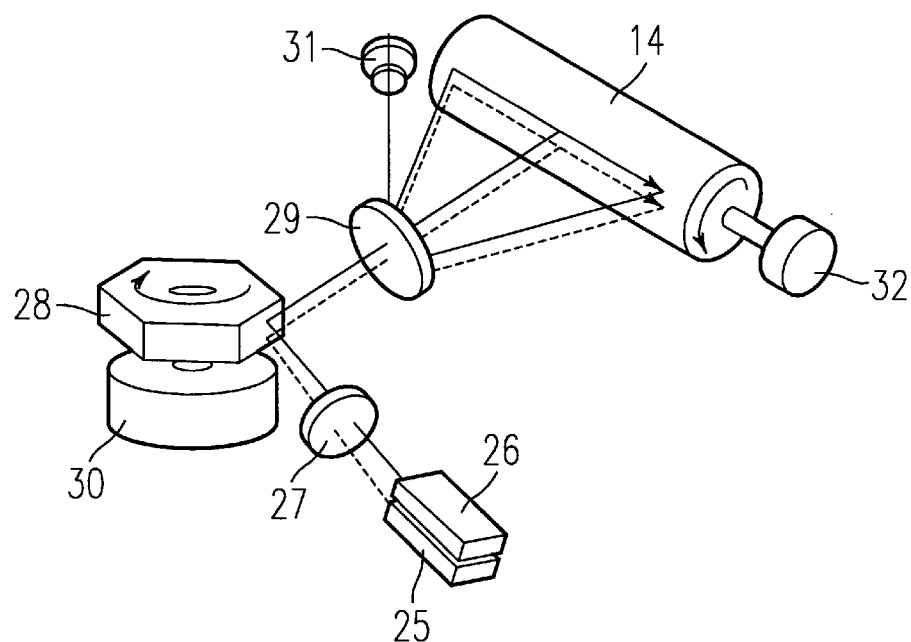
FIG. 1 shows a general configuration of a multiple beam writing system.

The preferred embodiments of the present invention will now be explained in further detail below, in which like reference numerals designate identical or corresponding parts throughout the several views.

Figure 4:
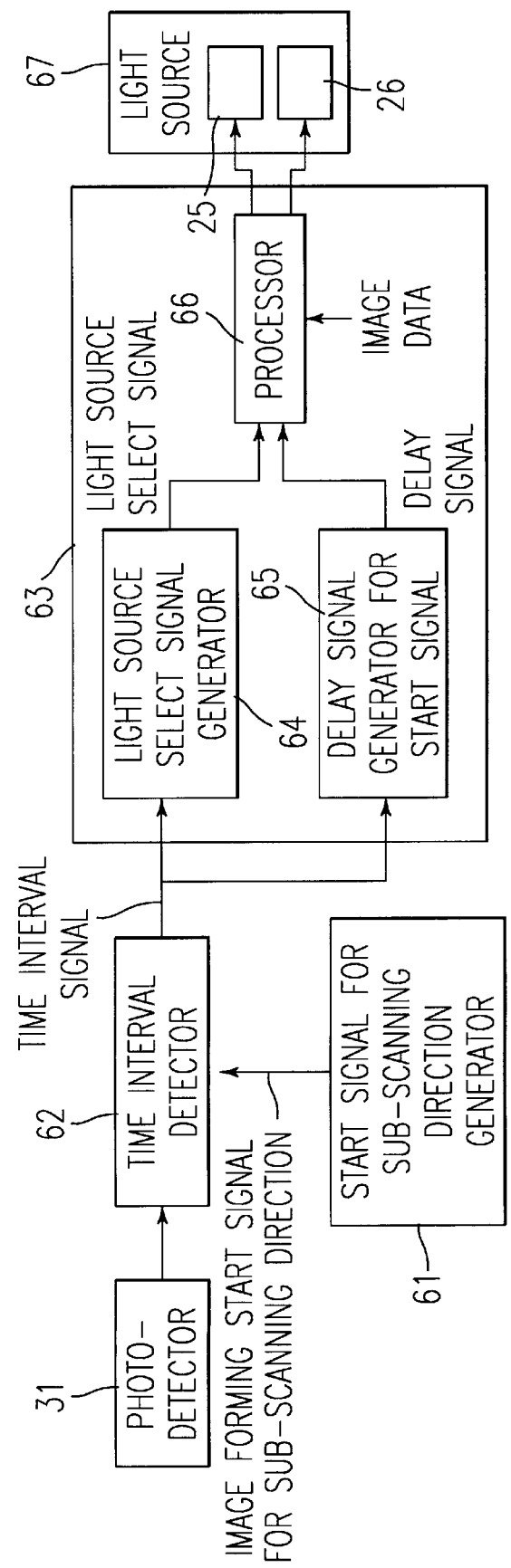
FIG. 4 shows a block diagram construction of an embodiment of the present invention.

FIG. 4 shows an overall block diagram construction of the multiple beam image forming apparatus of the present invention. The image forming apparatus of the present invention includes an overall image scanning structure as shown in FIG. 1 in which a photodetector 31 is provided to generate a synchronous signal for starting scanning in the scanning direction, i.e., to begin writing onto the photoconductive drum 14 of FIG. 1.

Further, a multiple beam light source 67 is provided which includes the first and second light sources 25 and 26. The present invention further includes a start signal generator 61 which generates a start signal for a sub-scanning direction (to start rotation of the photoconductive drum 14 of FIG. 1) and a time interval detector 62 for detecting a time interval between the start signal for the sub-scanning direction and the synchronous signal for the scanning direction. The output of this time interval detector 62 is provided to an overall controller 63 which includes both a light source select signal generator 64 and a delay signal generator for start signal 65. The light source select signal generator 64 can output a signal to selectively select one of the light sources 25 and 26 to operate so that a first line can be written by only one of the light sources 25 and 26. The delay signal generator for the start signal 65 can issue a signal to delay the writing by both of the light sources 25 and 26. A processor 66 receives the output of the light source select signal generator 64 and the delay signal generator 65 and controls the multiple light sources 25 and 26 based on such received signals and based on the received image data.

The specific control operation executed by the overall controller 63 in the present invention is now described in detail with respect to FIGS. 5, 6, and 7. First, FIG. 5a and FIG. 6a set forth an ideal operation in which the designated synchronous signal to begin writing onto the photoconductive drum 14 occurs at the most proper point after the image forming start signal for the sub-scanning direction, and writing by both of the multiple light sources 25 and 26 is started at the most correct time. In FIG. 6 the circles which are cross-hatched represent data written by the light sources 25 and 26, and the hollow circles represent blank (nonwritten) areas. In this operation in the present invention in FIGS. 5a, 6a, during a first scanning operation both of the light sources 25 and 26 simultaneously record the lines 68 and 69 shown in FIG. 6a, and then simultaneously record the lines 70 and 71 in a next scanning operation. The starting of the writing occurs at the proper start point, as shown in both FIGS. 5a and 6a.

In the embodiments of the present invention as now discussed, and particularly with reference to FIGS. 5 and 7, the time interval T is defined as a time interval between two successive synchronizing signals for the scanning direction. That is, the time interval "T" is a time interval between two successive signals output from the photodetector 31. Further, the time interval "t" is a time interval from the image forming start signal for the sub-scanning direction, as generated by the start signal for sub-scanning direction generator 61, until a designated synchronizing signal for the scanning direction to begin writing onto the photoconductive drum 14, as output by the photodetector 31. As noted above, in such a device as in the present invention after an image forming start signal for the sub-scanning direction is generated, a certain number of synchronizing signals may be generated until a designated synchronizing signal, which indicates to start writing onto the photoconductive drum 14, is generated. This time period "t" is the time period from the image forming start signal for the sub-scanning direction to the designated synchronizing signal for the scanning direction to begin writing relative to one cycle for generating the synchronizing signal for the scanning direction, as shown in FIGS. 5 and 7.

Figure 5A:
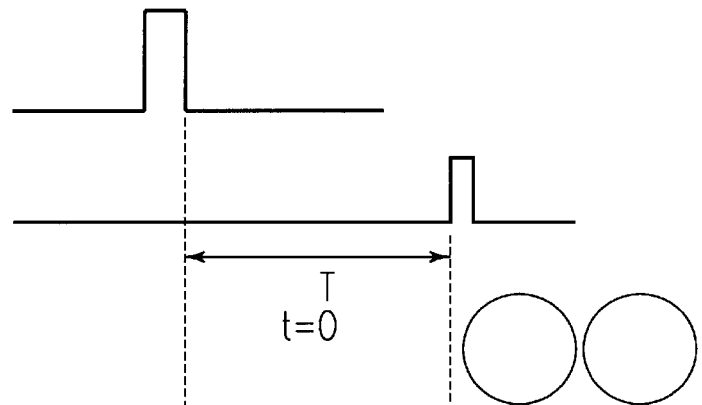
FIGS. 5a–5b explains a control of a writing operation in an embodiment of the present invention.
Figure 5B:
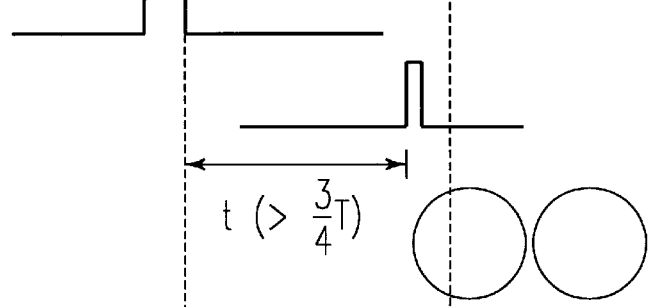
Figure 5C:
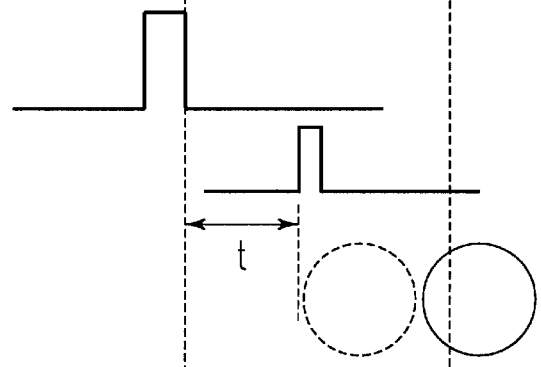

FIGS. 5b, 6b, and 7b show a situation in which the time interval "t" from generating the image forming start signal for the sub-scanning direction (as generated by the start signal for the sub-scanning direction generator 61) to the designated synchronous signal for the scanning direction (as generated by the photodetector 31) is greater than three-fourths T (t>¾ T). In this situation, control is effectuated in the present invention such that both the multiple light sources 25 and 26 write signals after the designated synchronous signal. In this situation, a negative vertical regist shift does slightly occur such that the writing is begun slightly early. That is, in this operation a top margin on a sheet is actually slightly reduced. A second case as shown in FIG. 5c, FIG. 6c, and FIG. 7c is that the time interval "t" from the image forming start signal for the sub-scanning direction to the designated synchronous signal for the scanning direction (which is to indicate the starting of writing) is less than three-fourths T but is greater than one-fourth T (T/4<t<¾ T). In this situation, the light source select generator 64 outputs a signal to the processor 66 such that only the second light source 26 generates a light beam based on a writing signal corresponding to the first line. In this situation there is also a slightly negative vertical regist shift, i.e., corresponding to the top margin on a sheet is again slightly reduced.

Figure 5D:
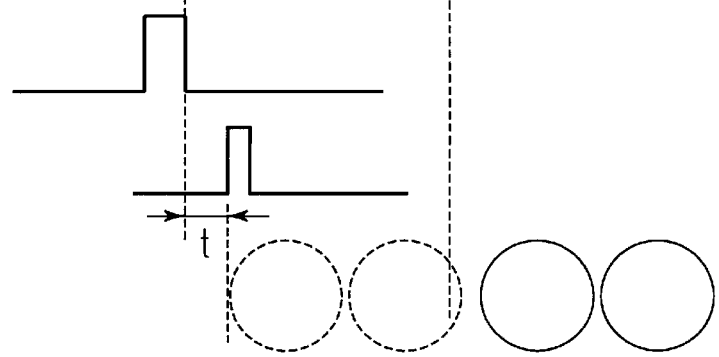

A third case as shown in FIG. 5d, FIG. 6d, and FIG. 7d is that the time interval "t" from the image forming start signal for the sub-scanning direction to the designated synchronous signal for the scanning direction indicating the starting of writing is less than one-fourth T (t<¼ T). In this situation, the delay signal generator for the start signal 65 outputs a delay signal to the processor 66, and based on this output delay signal the processor 66 delays the writing from both of the light sources 25 and 26. In this situation, there is a slight positive vertical regist shift from the beginning of writing by the light sources 25 and 26, however this vertical regist shift is small and is less than one-half of a line.

In the operations as discussed above, by considering the four cases as noted above, the amount of vertical regist shift can be varied from anywhere from minus one-half line (i.e. a reduced top margin of up to one-half line width) to plus one-half line (i.e. an increased top margin of up to one-half line width). This is a significant improvement over the background art in which a regist shift can be up to plus one line. The operation in the present invention as discussed above allows an operation in which writing by the light sources 25 and 26 can occur slightly early, and as a result an appearance of the total amount of the vertical regist shift in the present invention is reduced.

Figure 8C:
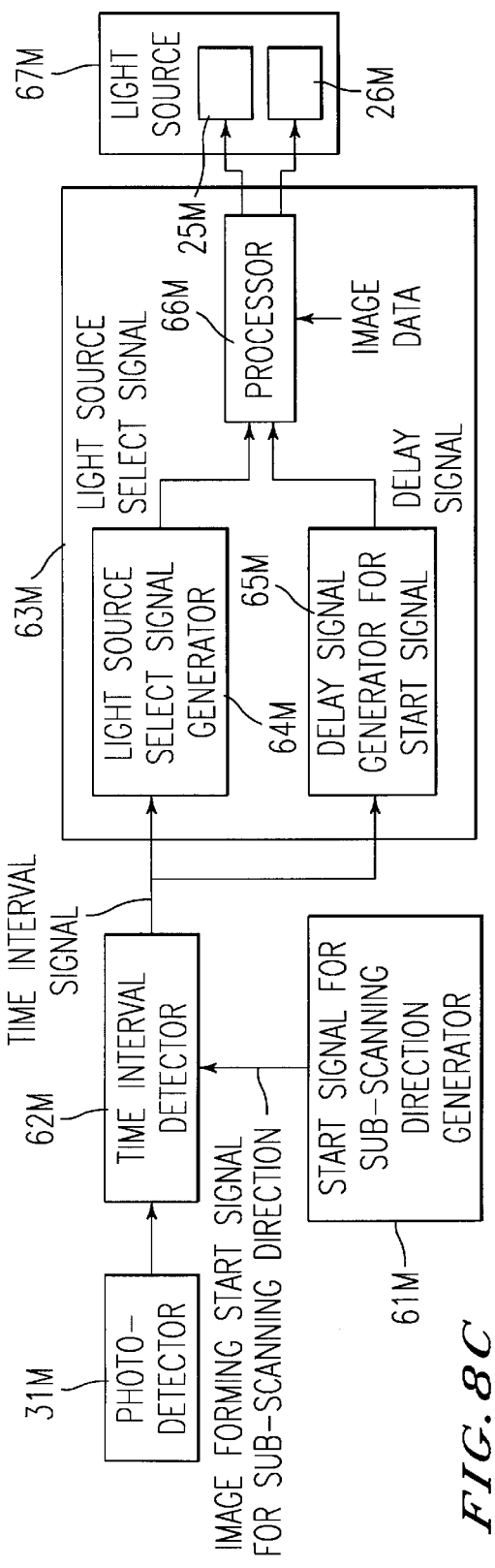
FIG. 8 shows a block diagram construction of the present invention in a multicolor image forming apparatus.
Figure 8D:
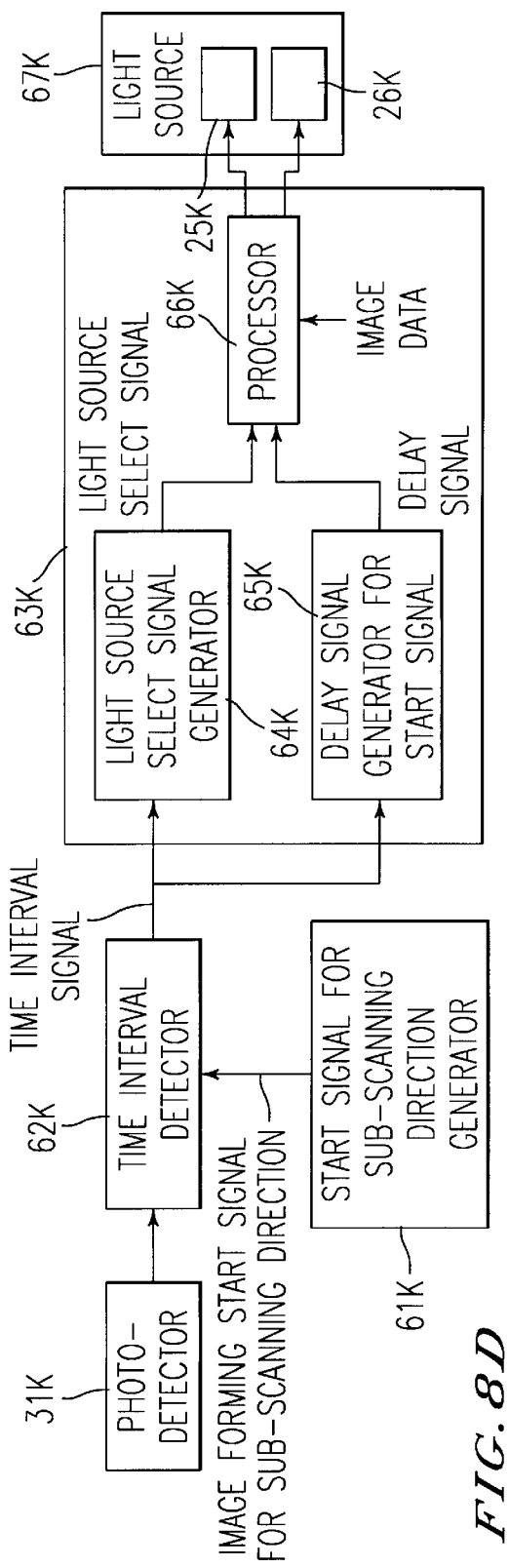

FIG. 8 shows the implementation in the present invention when utilized in a multicolor image forming apparatus. As shown in FIG. 8, the present invention can be easily implemented in a full color image forming apparatus by utilizing one of the overall control system as shown in FIG. 4 for each of the desired colors of, i.e., yellow (Y), cyan (C), magenta (M), and black (K). The structure of the multicolor system of FIG. 8 operates in a similar manner as the system of FIGS. 4–7 discussed above, and thus a redundant explanation of the operation of the structure of FIG. 8 is omitted here.

Moreover, the present invention can be implemented in several types of image forming apparatus which utilizes a multiple beam optical unit. Examples of image forming apparatuses in which the present invention can be implemented are now provided, although it is noted that the present can be implemented in other examples of image forming apparatuses than as expressly noted herein.

Figure 9:
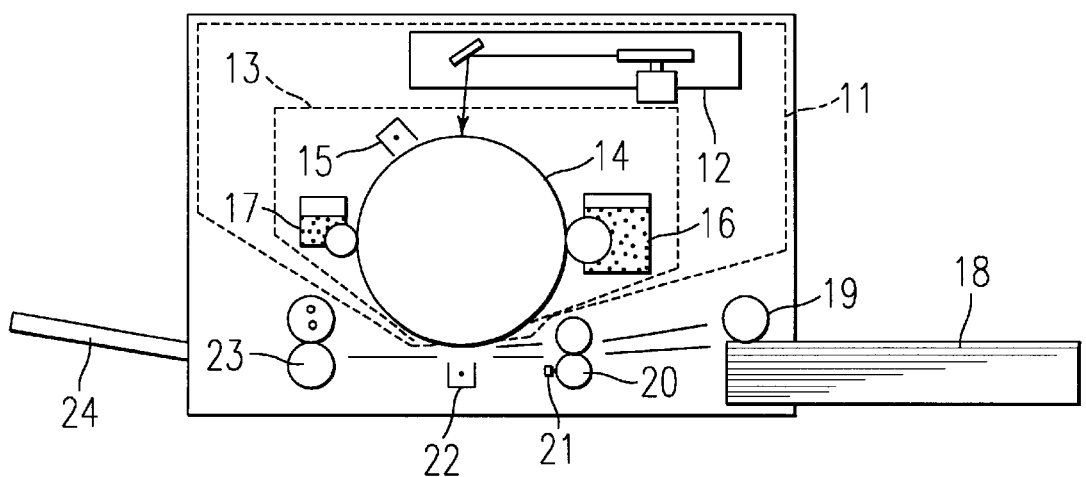
FIG. 9 shows one example of an image forming apparatus in which the present invention can be implemented.

FIG. 9 shows a monocolor image forming apparatus which utilizes a multiple laser beam optical system 12 (which can be implemented as the multiple laser beam optical system of FIG. 1). This device includes an image forming station 11 which in turn includes an image forming unit 13. The image forming unit 13 includes a photoconductive drum 14, a charger 15, a developing unit 16, and a cleaning unit 17. Further, paper sheets are supplied from a sheet supply cartridge 18 after being fed from a feed roller 19. The paper sheets are fed through a pair of regist rollers 20 and are detected by a sheet detector 21. In this image forming apparatus as shown in FIG. 9, the output of the sheet detector 21 corresponds to the start signal for the sub-scanning direction generator 61 of FIG. 4. The image forming apparatus shown in FIG. 1 further includes a toner image transfer charger 22, an image fixing roller 23, and a sheet eject tray 24.

Figure 10:
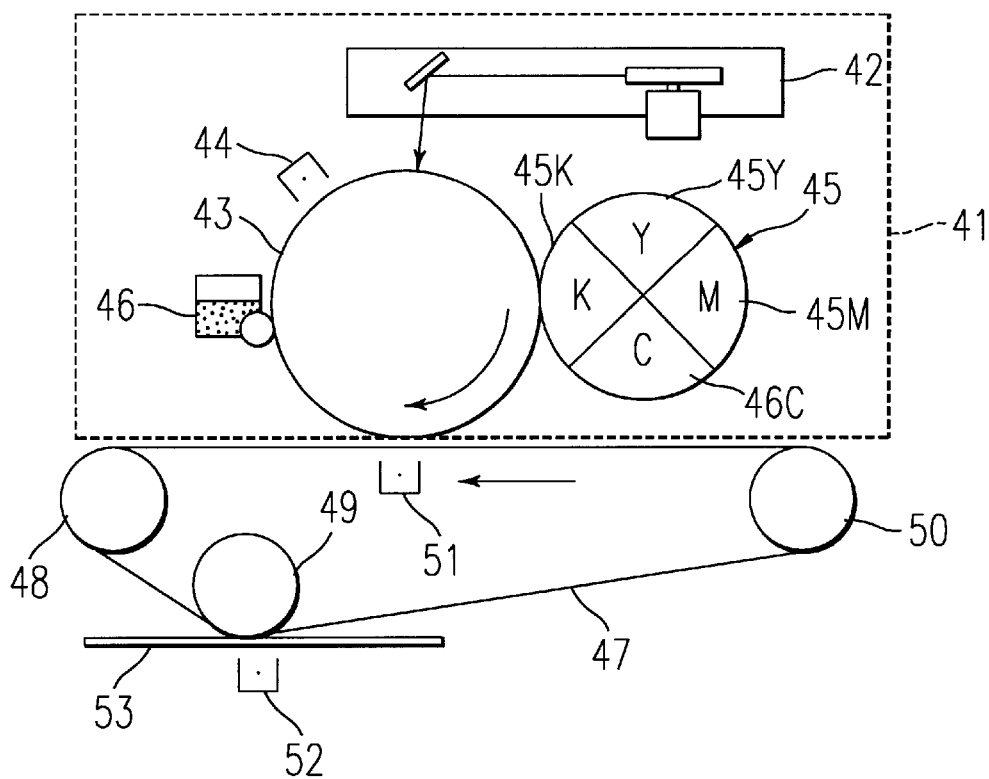
FIG. 10 shows a further example of an image forming apparatus in which the present invention can be implemented.

FIG. 10 shows a full color image forming apparatus in which the present invention can also be implemented. The full color image forming apparatus shown in FIG. 10 includes a multiple beam optical unit 42 (which also can be implemented as the multiple laser beam optical system of FIG. 1) included in an image forming station 41. Further, a developing unit 45 is also provided with individual developing units 45Y, 45M, 45C, 45K for each of the colors yellow (Y), magenta (M), cyan (C) and black (K). An image is formed on the photoconductive drum 43, which is surrounded by an electrical charger 44 and a cleaning unit 46. Formed opposite the image forming unit 41 is an intermediate transfer belt 47 on which images are intermediately formed. This intermediate transfer belt 47 is supported by rollers 48, 49, and 50. Further, an intermediate transfer charger 51 effectuates transfer of images from the photoconductive drum 43 to the intermediate transfer belt 47. The full color image from the intermediate transfer belt 47 is then provided to a sheet of paper 53 under the control of a transfer charger 52.

Figure 17:
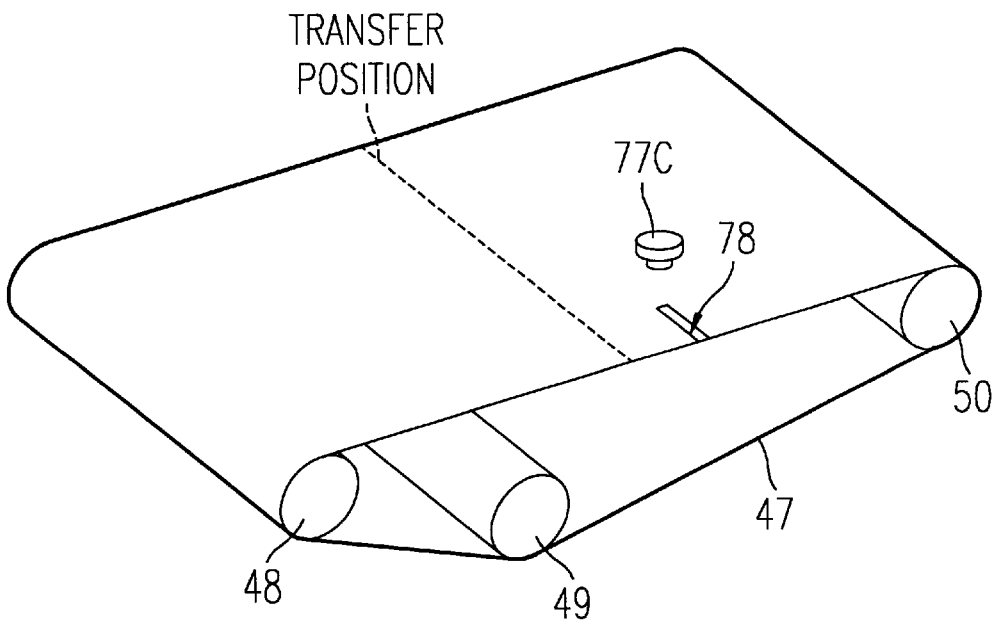
FIG. 17 shows specific elements in certain image forming apparatuses in which the present invention can be implemented.

This image forming apparatus as shown in FIG. 10 can employ the belt of FIG. 17 which includes a register mark 78 which is detected by a register mark detector 77. This register mark detector 77C in this image forming apparatus corresponds to the start signal for sub-scanning direction generator 61 of FIG. 4.

Figure 11:
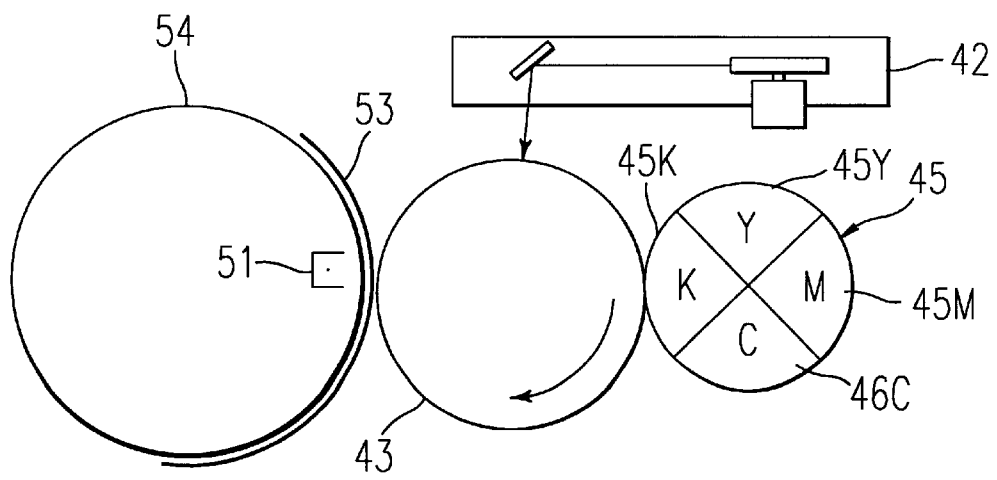
FIG. 11 shows a further example of an image forming apparatus in which the present invention can be implemented.
Figure 15:
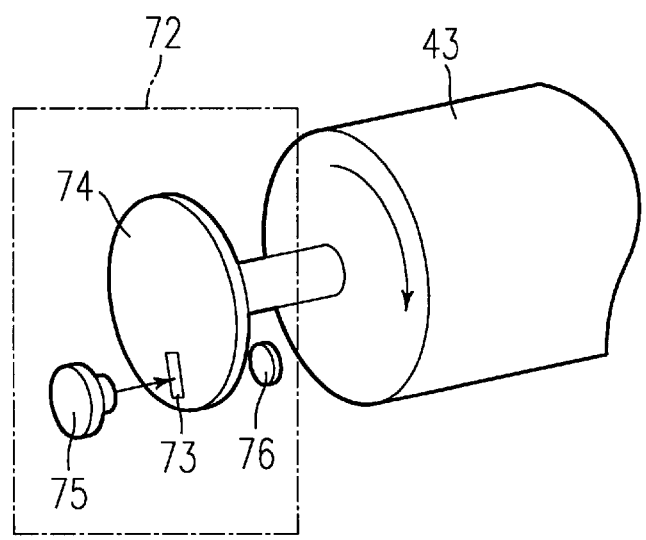
FIG. 15 shows specific elements in certain image forming apparatuses in which the present invention can be implemented.

FIG. 11 shows a further full color image forming apparatus in which the present invention can be implemented. The image forming apparatus of FIG. 11 also includes the multiple beam optical unit 42, developing unit 45, and photoconductive drum 43. In this full color image forming apparatus a sheet 53, e.g., a paper sheet, is disposed between the photoconductive drum 43 and an intermediate transfer drum 54, and an image is transferred to the sheet 53 by a transfer charger 51. This embodiment shown in FIG. 11 can employ the specific circuitry of FIG. 15 in which a position of the photoconductive drum 43 is detected by a position detector 72. The position detector 72 includes a rotating plate 74 which rotates with the photoconductive drum and which includes a slit 73. A light source 75 is aligned with a light detector 76 and the light detector 76 reads a signal when the slit is disposed between the light source 75 and the light detector 76. Thus, the output of the light detector 76 provides an indication of the position of the photoconductive drum 43. The output of the light detector 76 in this embodiment corresponds to the start signal for the sub-scanning direction generator 61 of FIG. 4.

Figure 12:
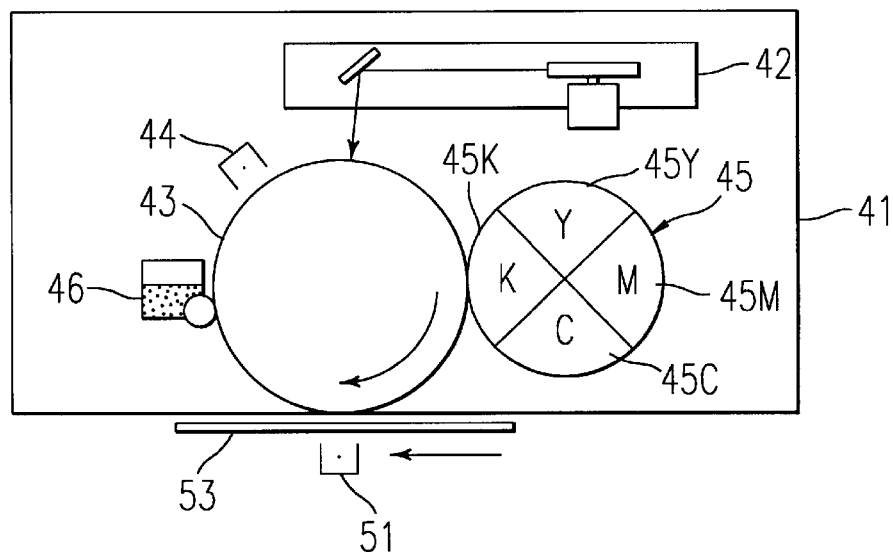
FIG. 12 shows a further example of an image forming apparatus in which the present invention can be implemented.

FIG. 12 shows a further full color image forming apparatus in which the present invention can be implemented and which also utilizes the multiple beam optical unit 42. This embodiment is similar to the embodiment of FIG. 10 except that no intermediate transfer belt is provided, and as a result transfer of an image from photoconductive drum 43 is directly effectuated to a sheet recording medium 53. This system can also employ the system of FIG. 15 to determine the position of the photoconductive drum 43.

Figure 13:
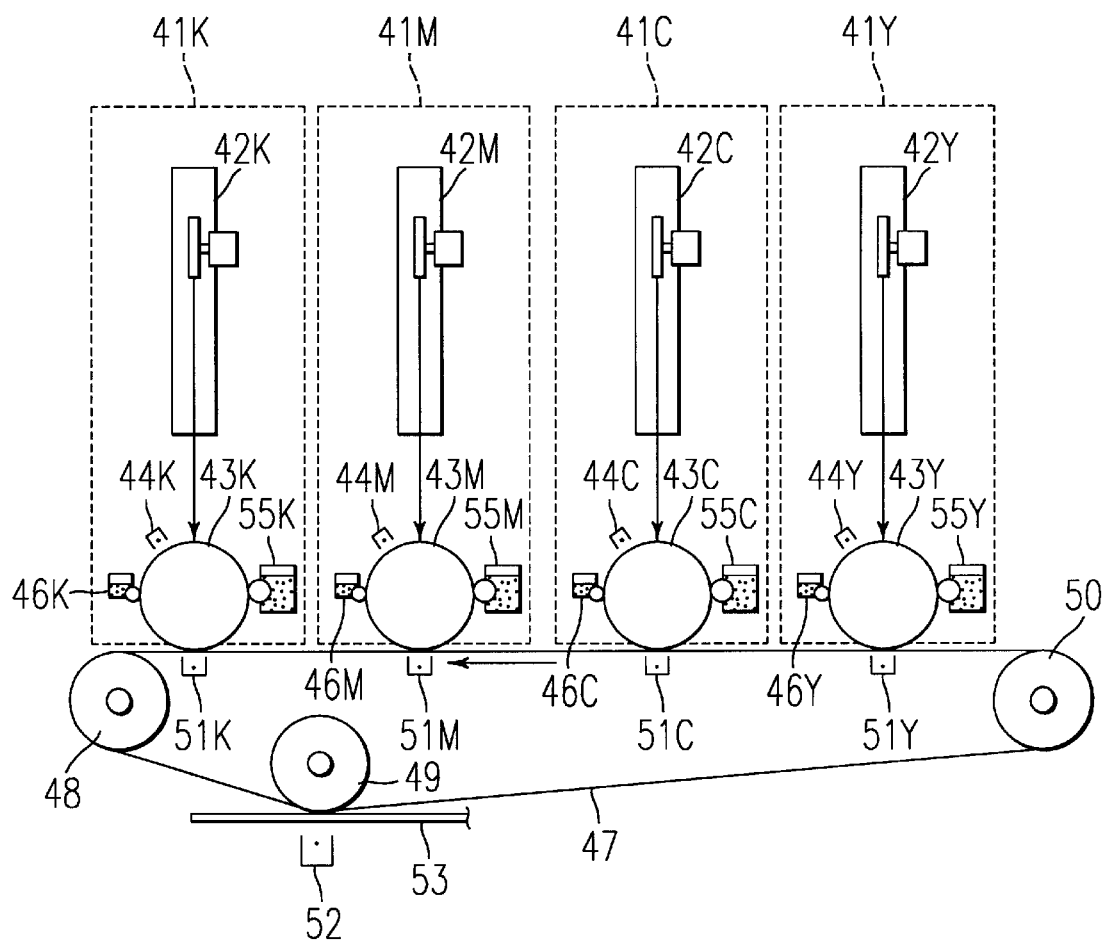
FIG. 13 shows a further example of an image forming apparatus in which the present invention can be implemented.
Figure 16:
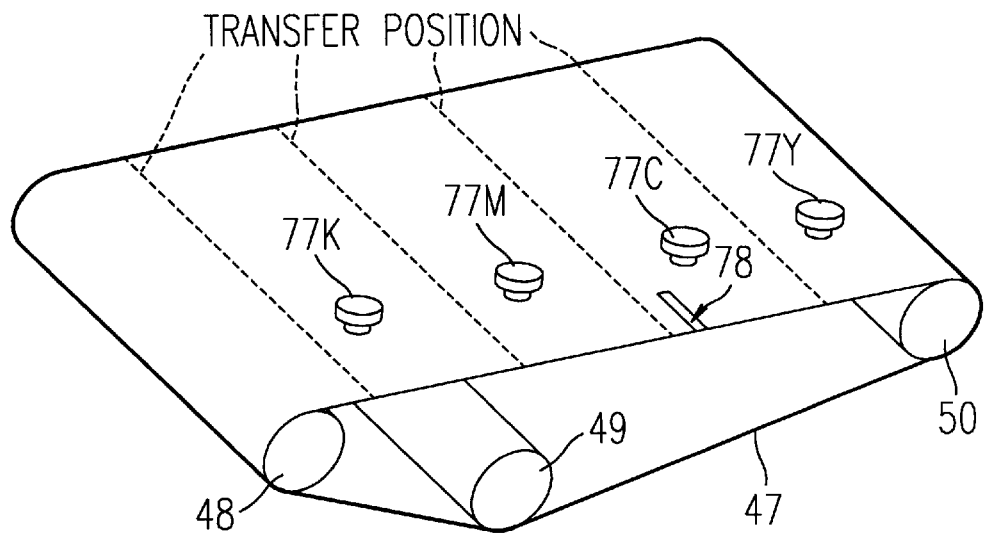
FIG. 16 shows specific elements in certain image forming apparatuses in which the present invention can be implemented.

FIG. 13 shows a further full color image forming apparatus in which the multicolor structure of the present invention as shown in FIG. 8 can be implemented. In the embodiment shown in FIG. 13 each color image forming unit 41Y–41K includes its own respective multiple beam optical unit 42Y–42K. Each beam optical unit also includes its own developing unit 55Y–55K, and an intermediate transfer belt 47 is formed opposite intermediate transfer chargers 51Y–51K. This full color image forming apparatus as shown in FIG. 13 can implement the intermediate transfer belt as shown in FIG. 16 which includes a register mark 78, and which further includes four register mark detectors 77Y–77K. The outputs of the four register mark detectors 77Y—77K correspond to the start signal for sub-scanning generators 61Y—61K shown in FIG. 8 of the present specification.

Figure 14:
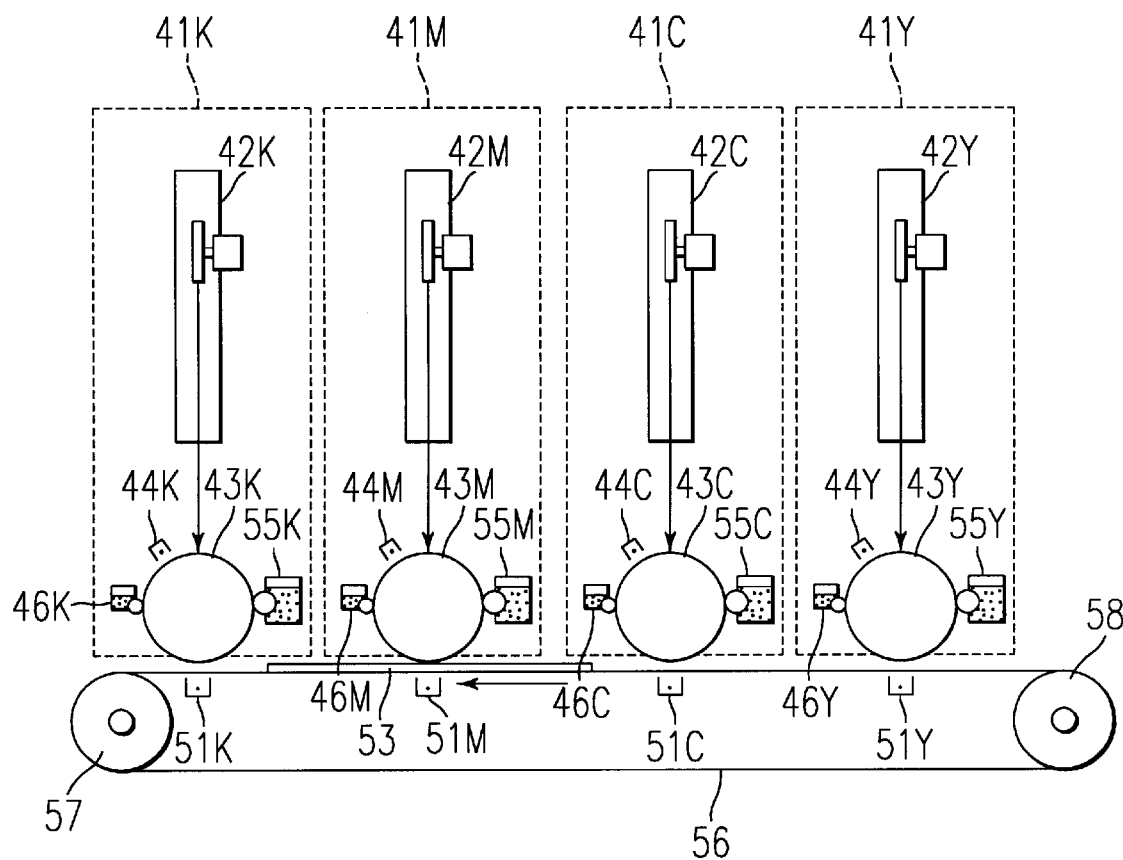
FIG. 14 shows a further example of an image forming apparatus in which the present invention can be implemented.

FIG. 14 shows a further full color image forming apparatus to which the present invention can be implemented similar to that shown in FIG. 13 except that no intermediate transfer belt is provided, i.e., a direct transfer to a paper sheet is implemented.

Each of the above-noted monocolor and full color image forming apparatuses can employ the control system of the present invention to minimize a vertical regist shift.

Obviously, numerous additional modifications and variations of the present invention are possible in light of the above teachings. It is therefore to be understood that within the scope of the appended claims, the present invention may be practiced otherwise than as specifically described herein.

The present document is based on Japanese Priority Document 10-11155 filed in the Japanese Patent Office on Jan. 23, 1998, the entire contents of which are incorporated herein by reference.

What is claimed is:

1. An image forming apparatus including a multiple beam writing system, the multiple beam writing system including multiple beam sources, and generating a start signal for a sub-scanning direction and a synchronous signal for a scanning direction, the image forming apparatus comprising:

a detector configured to detect a time interval between the start sign for the sub-scanning direction and the synchronous signal for the scanning direction; and a controller configured to compare the detected time interval with at least first and second threshold values and to control writing by the multiple beam sources based on results of the comparison, wherein the multiple beam sources include first and second beam sources, the first threshold value is one-quarter T and the second threshold value is three-quarter T, where T is a time interval between two consecutive synchronous signals for the scanning direction.

2. An image forming apparatus according to claim 1, wherein when the detected time interval is less than the first threshold value of one-quarter T, the first and second multiple beam sources simultaneously begin writing based on a synchronous signal immediately after a designated synchronous signal.

3. An image forming apparatus according to claim 1, wherein when the detected time interval is greater than the second threshold value of three-quarter T, the first and second multiple beam sources simultaneously begin writing based on a designated synchronous signal.

4. An image forming apparatus according to claim 1, wherein when the detected time interval is between the first time interval of one-quarter T and the second time interval of three-quarter T, during a first writing cycle only the first beam source of the first and second beam sources writes based on a designated synchronous signal.

5. An image forming apparatus according to claim 2, wherein when the detected time interval is greater than the second threshold value of three-quarter T, the first and second multiple beam sources simultaneously begin writing based on a designated synchronous signal.

6. An image forming apparatus according to claim 5, wherein when the detected time interval is between the first time interval of one-quarter T and the second time interval of three-quarter T, during a first writing cycle only the first beam source of the first and second beam sources writes based on a designated synchronous signal.

7. An image forming apparatus according to claim 1, wherein a number of the threshold values is equal to a number of the beam sources.

8. An image forming apparatus including a multiple beam writing means, the multiple beam writing means including multiple beam sources and means for generating a start signal for a sub-scanning direction and a synchronous signal for a scanning direction, the image forming apparatus comprising:

detector means for detecting a time interval between the start signal for the sub-scanning direction and the synchronous signal for the scanning direction; and control means for comparing the detected time interval with at least first and second threshold values and to control writing by the multiple beam sources based on results of the wherein the multiple beam sources include first and second beam sources, the first threshold value is one-quarter T and the second threshold value is three-quarter T, where T is a time interval between two consecutive synchronous signals for the scanning direction.

9. An image forming apparatus according to claim 8, wherein when the detected time interval is less than the first threshold value of one-quarter T, the first and second multiple beam sources simultaneously begin writing based on a synchronous signal immediately after a designated synchronous signal.

10. An image forming apparatus according to claim 8, wherein when the detected time interval is greater than the second threshold value of three-quarter T, the first and second multiple beam sources simultaneously begin writing based on a designated synchronous signal.

11. An image forming apparatus according to claim 8, wherein when the detected time interval is between the first time interval of one-quarter T and the second time interval of three-quarter T, during a first writing cycle only the first beam source of the first and second beam sources writes based on a designated synchronous signal.

12. An image forming apparatus according to claim 9, wherein when the detected time interval is greater than the second threshold value of three-quarter T, the first and second multiple beam sources simultaneously begin writing based on a designated synchronous signal.

13. An image forming apparatus according to claim 12, wherein when the detected time interval is between the first time interval of one-quarter T and the second time interval of three-quarter T, during a first writing cycle only the first beam source of the first and second beam sources writes based on a designated synchronous signal.

14. An image forming apparatus according to claim 8, wherein a number of the threshold values is equal to a number of the beam sources.

15. An image forming method for a multiple beam writing system, the multiple beam writing system including multiple beam sources and generating a start signal for a sub-scanning direction and a synchronous signal for a scanning direction, the image forming method comprising steps of;

detecting a time interval between the start signal for the sub-scanning direction and the synchronous signal for the scaring direction;

comparing the time interval with at least first and second threshold values; and controlling writing by the multiple beam sources based on results of the comparison, wherein the multiple beam sources include first and second beam sources simultaneously, the first threshold value is one-quarter T and the second threshold value is three-quarter T, where T is a time interval between two consecutive synchronous signals for scanning direction.

16. An image forming method according to claim 15, wherein when in the detecting step the detected time interval is less than the first threshold value of one-quarter T, the first and second multiple beam sources simultaneously begin writing after a designated synchronous signal.

17. An image forming method according to claim 15, wherein when in the detecting step the detected time interval is greater than the second threshold value of three-quarter T, the first and second multiple beam sources simultaneously begin writing after a designated synchronous signal.

18. An image forming method according to claim 15, wherein when in the detecting step the detected time interval is between the first time interval of one-quarter T and the second time interval of three-quarter T, during a first writing cycle only the first beam source of the first and second beam sources writes after a designated synchronous signal.

19. An image forming method according to claim 16, wherein when in the detecting step the detected time interval is greater than the second threshold value of three-quarter T, the first and second multiple beam sources simultaneously begin writing after a designated synchronous signal.

20. An image forming method according to claim 19, wherein when in the detecting step the detected time interval is between the first time interval of one-quarter T and the second time interval of three-quarter T, during a first writing cycle only the first beam source of the first and second beam sources writes after a designated synchronous signal.

21. An image forming method according to claim 15, wherein a number of the threshold values is equal to a number of the beam sources.

* * * * *